July 11, 1950

R. SHELTON 2,514,522

TOBACCO PLANTER

Filed May 23, 1947

INVENTOR:
RALPH SHELTON,
BY:
*Pierce, Scheffler & Parker,*
*Attorneys.*

July 11, 1950

R. SHELTON 2,514,522

TOBACCO PLANTER

Filed May 23, 1947

INVENTOR:
RALPH SHELTON,
BY:
Pierce, Scheffler & Parker,
Attorneys.

July 11, 1950 R. SHELTON 2,514,522
TOBACCO PLANTER

Filed May 23, 1947 6 Sheets-Sheet 6

Inventor:
RALPH SHELTON,

By Pierce, Scheffler & Parker
Attorneys

Patented July 11, 1950

2,514,522

UNITED STATES PATENT OFFICE 2,514,522

TOBACCO PLANTER

Ralph Shelton, Chatham, Va.

Application May 23, 1947, Serial No. 750,026

10 Claims. (Cl. 111—3)

This invention relates to machines designed for use in transplanting sprouts such as tobacco, cabbage, tomatoes and plants of like character which require replanting in rows at spaced intervals after the small sprouts have previously been grown from seeds in a seedbed.

An object of the invention is to provide an improved planting assembly for machines of the class described which receives the plants one-by-one from a plant carrier, opens a ground hole, deposits the plant and then waters it. Another object is to provide an improved plant carrier or magazine from which the plants are fed automatically to the automatic planting assembly, the magazine being capable of holding a much larger number of plants than the plant carriers now known and which thereby enables the machine to be operated for a much longer time without reloading. Another object is to provide an improved plant magazine for automatic transplanting machines that may be loaded with plants prior to starting the planting operation in the field, a number of magazines so loaded being carried on the machine and inserted into the automatic feed mechanism in succession as they become empty.

These and other objects and advantages to be derived from the invention will become more apparent from the following detailed description of a preferred construction when considered with the accompanying drawings.

Referring now to the drawings, the planting machine comprises a main support frame 1, the rear end of the frame being carried by an axle 2 that is journaled in sleeve bearings 3 located at the lower end of diagonal struts 4 at each side of the frame. Wheels 5 are carried at the outer ends of axle 2 and one of the wheels is keyed at 6 to the axle so that the latter is turned as the wheel moves over the ground.

The forward end of the frame is carried by a single wheel 7 offset to one side of the longitudinal axis of the frame. Wheel 7 is carried by axle 8 that is journaled in sleeve bearings 11 at the lower open ends of a fork 12. A vertical pin 13 upstanding from fork 12 passes upwardly through a vertical sleeve bearing 10 that is carried at the forward end of frame 1. Fork 12 and the front wheel 7 are thus free to rotate about a vertical axis to guide the machine. In the illustrated embodiment, the machine is adapted to be pulled by a draft animal and hence is provided with a cross bar 14 pivotally supported by a forwardly extending arm 15 secured at one end to fork 12 and at the other end to a link 16 that is pivotally mounted to the frame side opposite fork 12 by a pin and sleeve bearing connection 17. A swingle-tree 18 is pivotally connected to cross bar 14 intermediate its ends for hitching the machine to a horse, mule or other draft animal. It is to be understood, however, that the particular means by which the machine is moved along the planting row is not of any particular importance and that the machine can also be tractor drawn or provided with its own powered propulsion unit.

Returning to the rear portion of the machine, it will be seen that the rear axle 2 carries a driving pinion 21 keyed to it and which is meshed with a driven pinion 22 carried rotatably on a transverse shaft 23 that is journaled in sleeve bearings 24 secured to frame members 25. A cam 26 provided with a plurality (four in the illustrated construction) of equally angular spaced rollers 27 is keyed or otherwise secured to shaft 23 so as to rotate with it and this cam is arranged to be driven from the wheel driven axle 2 as the machine moves along the ground, a clutch 28 being included to disconnect the cam 26 from its driving relation with wheels 5 whenever necessary.

Figure 9:
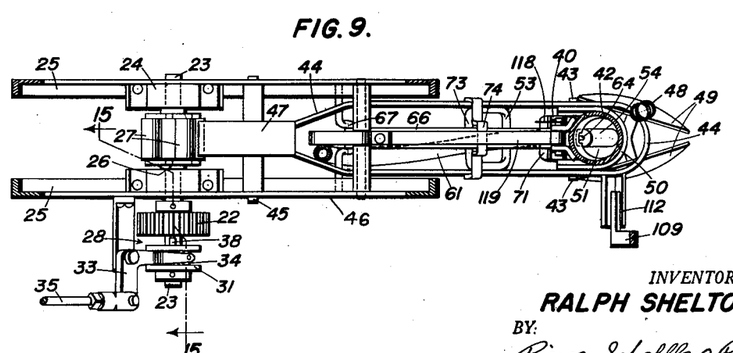
Fig. 9 is a horizontal section taken substantially on line 9—9 of Fig. 1.
Figure 10:
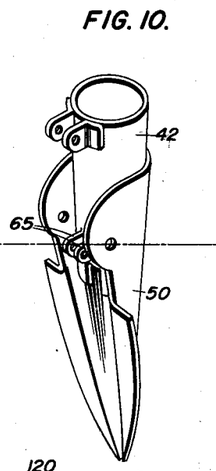
Fig. 10 is a perspective view of the hollow dibble.
Figure 11:
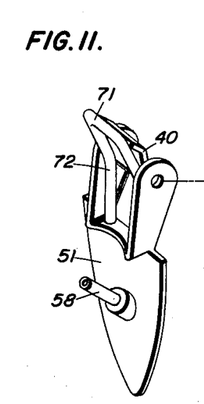
Fig. 11 is a perspective view of the hinged dibble jaw by which the mouth of the dibble is opened and closed.
Figure 15:
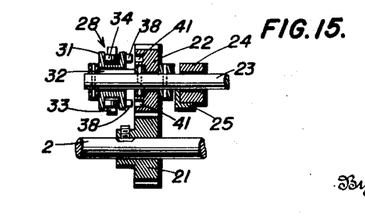
Fig. 15 is a detail section of the clutch, taken on line 15—15 of Fig. 9.

Clutch 28 (seen clearly in Fig. 15) includes a grooved collar 31 carried on shaft 23 by a key 32 so as to be non-rotatable relative thereto. However, collar 31 is movable axially along the shaft 23 by means of bell crank 33 and groove follower 34 (see Fig. 9) actuated by shaft 35 that terminates in a ring handle 36 well within the reach of the operator who sits on seat 37. Collar 31 is provided with diametrically opposite lugs 38 which are adapted to engage any pair of diametrically opposed complementary recesses 41 arranged in a circle in the side face of pinion 22. Thus to couple the axle 2 to the shaft 23 (and hence also to cam 26), clutch collar 31 is moved to the right as viewed from Fig. 15 whereupon pinion 22 driven by pinion 21 is coupled to shaft 23 through collar 31.

The planting assembly for planting the young plants at spaced intervals along the row includes a tube 42 pivotally supported at 43 between the legs of a substantially U-shaped arm 44. Tube 42 is located at the closed end of arm 44 and a transverse pivot pin 45 located intermediate the ends of this arm is journaled in spaced diagonal struts 46 to support the arm and planting tube 42 for pivotal motion in a vertical plane. A looped cam follower 47 is secured to the rearward end of arm 44 and is engaged periodically by the cam rollers 27 as cam 26 rotates to thus periodically tilt the forward end of arm 44 and hence tube 42 downwardly about its pivot support pin 45 from a normally horizontal position, to which the arm is normally urged by a tension spring 48 that is secured between arm 44 and the frame 1, in timed relation with forward movement of the machine, assuming of course that clutch 28 is engaged to couple the cam 26 to the wheels 5.

The lower end of the tube 42 terminates in a hollow dibble having fixed and pivotally movable jaws 50, 51, these jaws being normally urged to their closed position by a spring 52; one end of spring 52 is secured to the lower bridge of a double yoke 53 depending from arm 44 and the other spring end is attached to the movable jaw 51 above its hinged supporting point at pin 43.

Discs 49 rotatably mounted on the stationary jaw 50 of the dibble and which converge forwardly of jaw 50 serve to protect the point of the dibble from coming into direct contact with stones, stumps, sticks or any other solid object in the earth. As the discs 49 are also rotatable, they serve to reduce the "drag" encountered when the dibble enters the earth, and to break into smaller parts the earth that surrounds the young sprouts.

Figure 5:
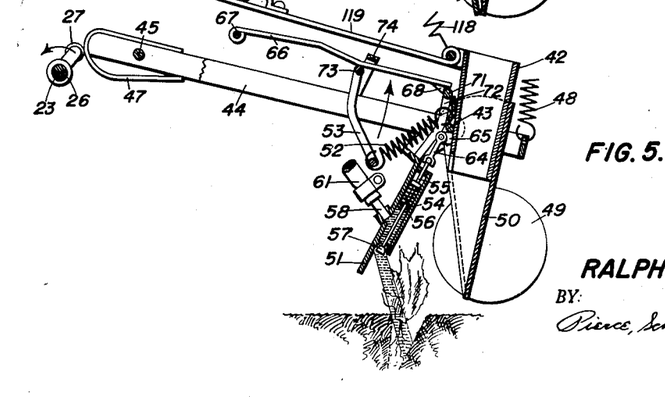
Fig. 5 is a detail sectional view of the planting and watering assembly at the beginning of its return movement wherein the plant is released and watered.
Figure 6:
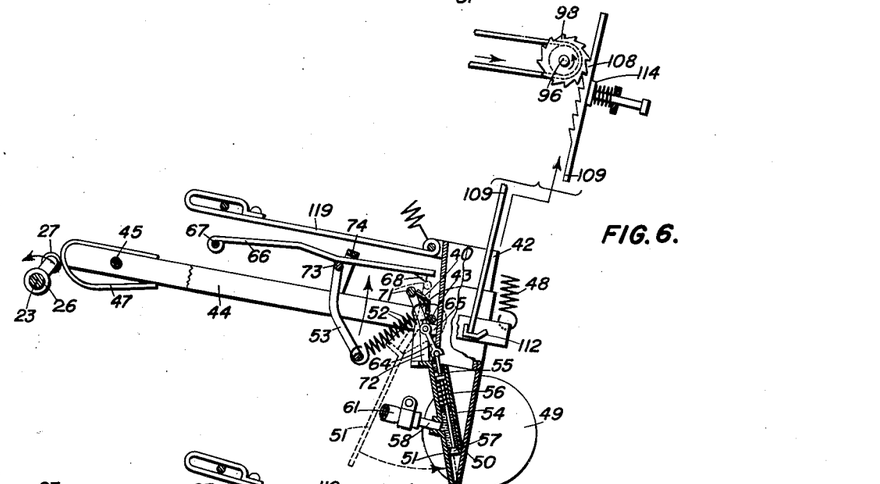
Fig. 6 is a view similar to Fig. 5, showing the assembly further up in its return movement wherein a step-motion of the plant feeding mechanism is begun.
Figure 7:
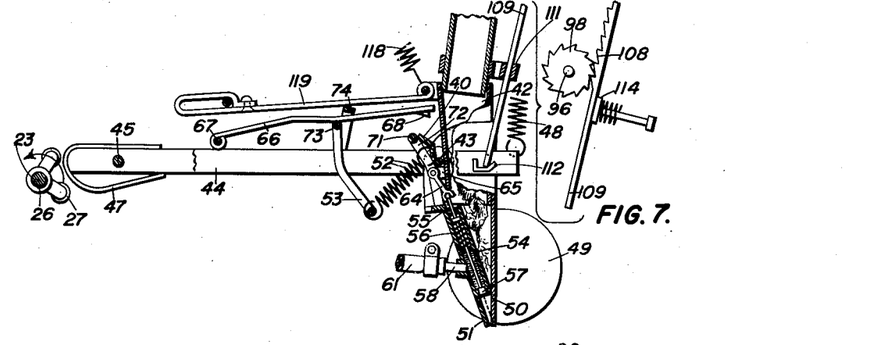
Fig. 7 is a view similar to Fig. 6, showing the assembly in its final position in correspondence with Fig. 1, the step-motion of the feed mechanism having ended and the next plant being in position.
Figure 12:
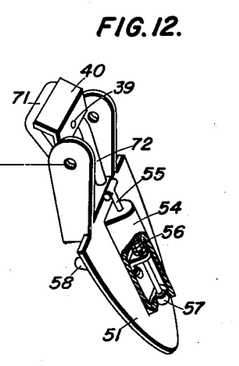
Fig. 12 is a perspective view showing the side of the hinged dibble jaw opposite to that shown in Fig. 11, the valve structure being partially in section.
Figure 13:
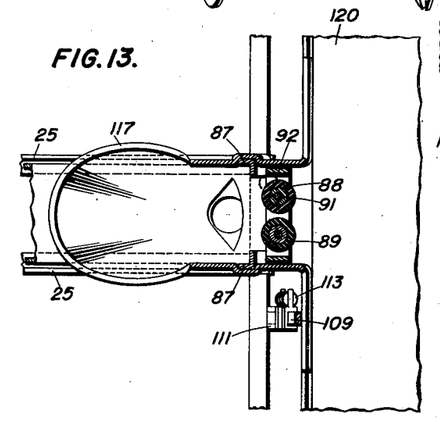
Fig. 13 is a horizontal section taken on line 13—13 of Fig. 8.
Figure 14:
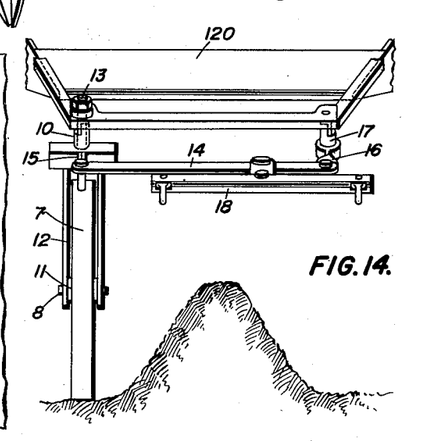
Fig. 14 is a front elevation of a part of the transplanter, particularly showing the steering assembly.

To the inside of movable jaw 51 is secured a valve housing 54 containing a valve stem 55 loaded by spring 56 to normally keep the valve head 57 closed upon its seat at the lower end of the housing 54. A nipple 58 extending through and secured to the wall of the movable jaw 51 connects with one end of a flexible hose 61, the other end of thise hose being connected to the outlet of a water tank 62 carried by the main frame 1. Tank 62 is filled with water through a capped opening 63 at the top and hence this water feeds downwardly through hose 61 into the normally closed valve housing 54. The top end of valve stem 55 which extends above the valve housing 54 and is T-shaped (see Fig. 12) is engaged by the slotted end of a link 64, the other end of this link being pivotally connected to a bracket 65 secured to the wall of tube 42. As shown in Figs. 6 and 7, so long as the jaws 50, 51 remain closed, spring 56 maintains the water valve closed. However, as the movable jaw 51 moves towards its open position as shown in Fig. 5, link 64 likewise pivots about its support. This brings the top end of valve housing 54 closer to the lower end of link 64 with the result that valve stem 55 is caused to move downwardly against the restoring action of compression spring 56 and open the valve.

It has been explained that the tube 42 is caused to move down periodically in timed relation with the forward movement of the machine. The jaws 50, 51 of the hollow dibble are arranged to be opened automatically to the position shown in Fig. 5 as soon as tube 42 begins to move upward from its lowermost position.

Figure 4:
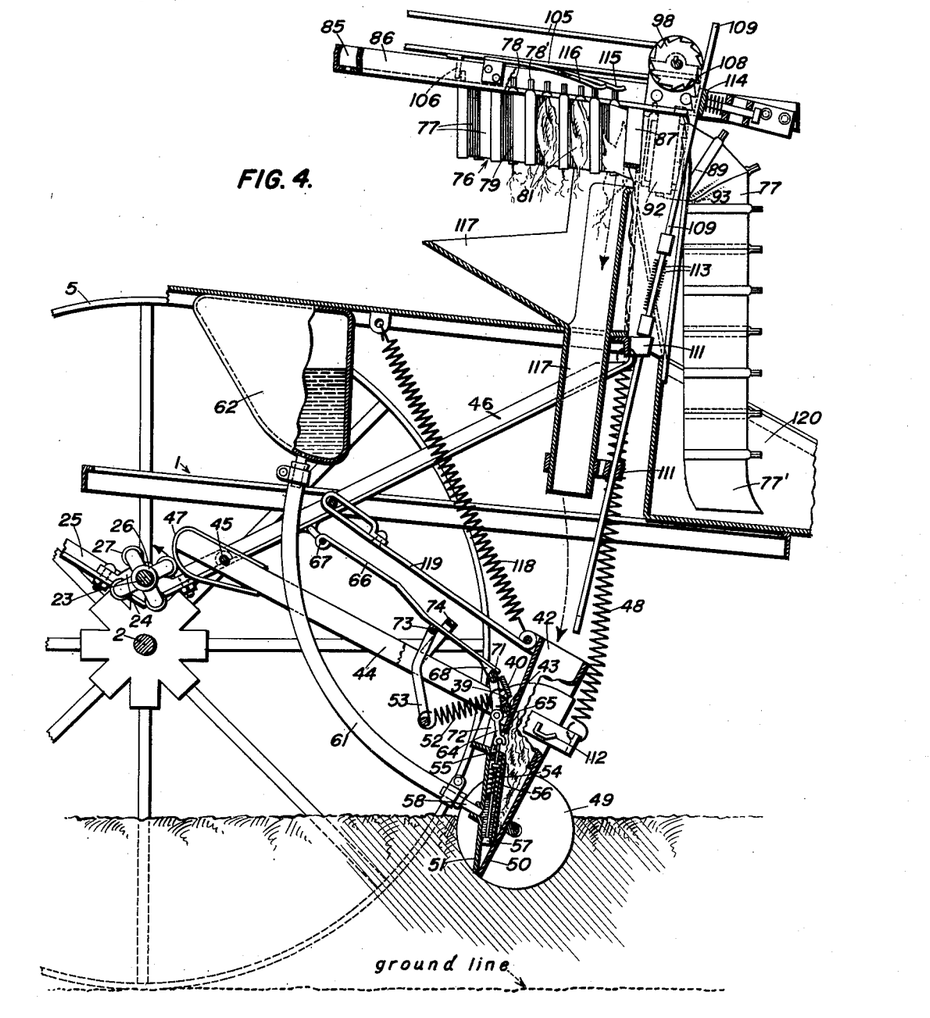
Fig. 4 is a vertical section taken on line 4—4 of Fig. 2, showing the planting and watering assembly in its lowermost position at which the plant is deposited in the ground.

The mechanism for accomplishing this includes a lever 66 hinged at its rear end to the frame strut 46 by a pin 67 and provided with a latch 68 at its forward end that is adapted to engage the bridge 71 of a yoke 72 attached to movable jaw 51, the yoke bridge 71 being located above the attaching point of the dibble closing spring 52. Lever 66 extends between the bridge piece 73 of the upper half of double yoke 53 and a U-member 74 also connected to arm 44. As arm 44 of the planting assembly begins its downward stroke from the Fig. 7 position, lever 66 is thus forced to follow it and when the lowermost position is reached as shown in Fig. 4, latch 68 at the end of lever 66 rides into engagement with the bridge 71 of yoke 72. As the cam follower 47 leaves the cam roller 27 permitting the planting arm 44 to begin its upward return stroke, latch 68 pushes on the upper end of yoke 72 causing the latter and hence also the jaw 51 to rotate on hinge pin 43 and open the mouth of the dibble as shown in Fig. 5. As the arm 44 continues to rise, lever 66 pressed upwardly by the bridge 73 causes latch 68 to ride free of yoke bridge 71 and thus permit the movable jaw 51 to reclose as shown in Fig. 6 under the restoring tension built up in spring 52.

The plants to be replanted are fed one at a time into the planting tube 42 in timed relation with the forward motion of the machine and periodic motion of the planting tube assembly from a magazine 76 which is comprised of a long strip 77 of cloth or other flexible fabric material. As shown particularly well in Fig. 3, inverted L-shaped support members 78, 78' made from flat metal stock extend transversely of strip 77 at spaced intervals and are secured to the strip at alternate sides thereof. Each of the L supports 78, 78' defines a folding point by which the entire length of the strip 77 may be folded back and forth upon itself into pockets 79, within each one of which a plant 81 is placed. The crease lines of the folds alternate right and left with one support L 78 to the right and the adjacent support L to the left, etc.

Support members 78 and 78' are holed at 82 to receive long poles 83 on which a plurality of the plant magazines 76 each loaded with plants can be carried atop the machine on horizontal bars 84. Spaced angle iron supports 85, 86 extending longitudinally of the machine frame 1 and supported by the latter on uprights 87 are provided and these are engaged by the foot portions of the L supports 78, 78' to thus hang and guide the folds or pockets of a loaded magazine 76 for movement forward into the feed mechanism by which the plants are periodically released from the magazine.

Figure 8:
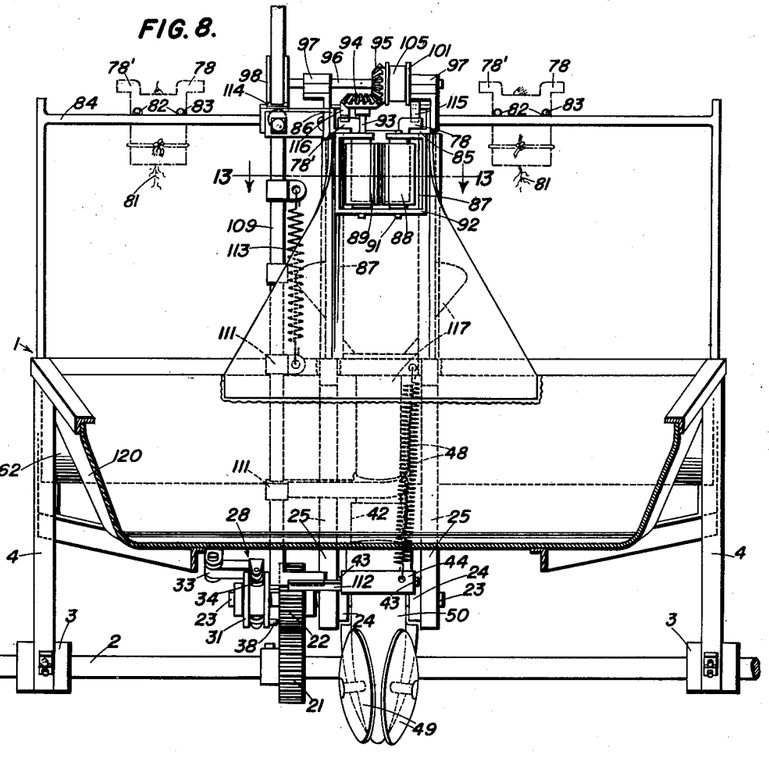
Fig. 8 is a vertical section taken on line 8—8 of Fig. 1.

The feed mechanism for the magazine, shown clearly in Fig. 8, is comprised of a pair of press rolls 88, 89 of rubber or like material between which the leading end of the strip 77 is inserted. Roll 88 is carried by a shaft 91 journalled in bracket 92 secured between supports 85, 86, and roll 89 is carried on a shaft 93 also journalled in bracket 92. The upper end of shaft 93, which serves as the drive shaft for the rolls, terminates in a beveled gear 94 meshed with beveled gear 95 keyed to a horizontal shaft 96 rotatable in sleeve bearings 97.

Figures 2, 3:
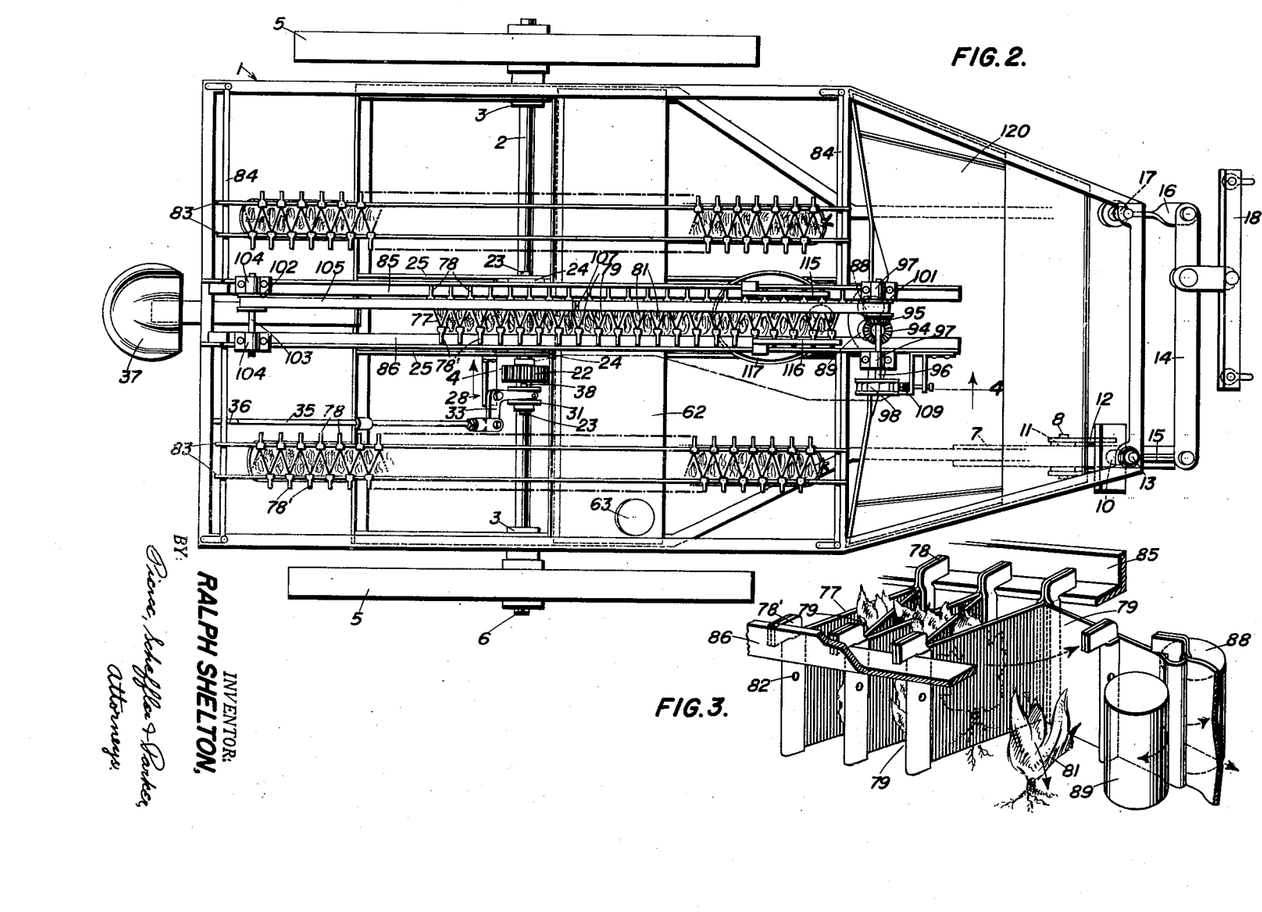
Fig. 2 is a plan view of the transplanter.
Fig. 3 is a perspective view of a portion of the plant magazine, illustrating the act of releasing a plant.

A ratchet gear 98 (see Fig. 4) is secured to the end of shaft 96 and the latter also carries a pulley 101. Another pulley 102 on shaft 103 journalled in bearings 104 is located at the rear of the machine as shown in Fig. 2, and a belt 105 extending between pulleys 101 and 102 is provided with two spaced tabs 106, 107 facing outwardly of the belt. The spacing between the tabs is made approximately equal to one half the length of belt 105 and each tab is relatively inflexible with respect to the belt at the point of attachment. The function served by each tab is to engage and press against the trail end of the loaded magazine 76 so as to move the latter forward as the lead end is fed past the rolls 88, 89 and thereby keep the folds or pockets 79 of the magazine pressed together tightly to prevent the plants 81 from slipping out. By the time that one of the tabs 106 has moved to the front of the machine as one plant magazine is emptied, the other tab 107 is in position to contact the rear end of the next fully loaded magazine to be inserted into feeding position.

Meshed with the ratchet gear 98 is a multi-toothed pawl 108 located at the upper end of a long rod 109 which extends through guides 111. The lower end of rod 109 turned inwardly is engaged periodically by a trough like projection 112 secured to the arm 44 and rod 109 moves upwardly from its position of rest shown in Fig. 4 each time that the planting assembly returns to a horizontal position. A spring 113 one end of which is anchored to a fixed part of the machine frame and the other fastened to rod 109 returns the latter to its rest position as the lower end of the rod is disengaged from projection 112 during the following downward stroke of the planting assembly.

Figure 1:
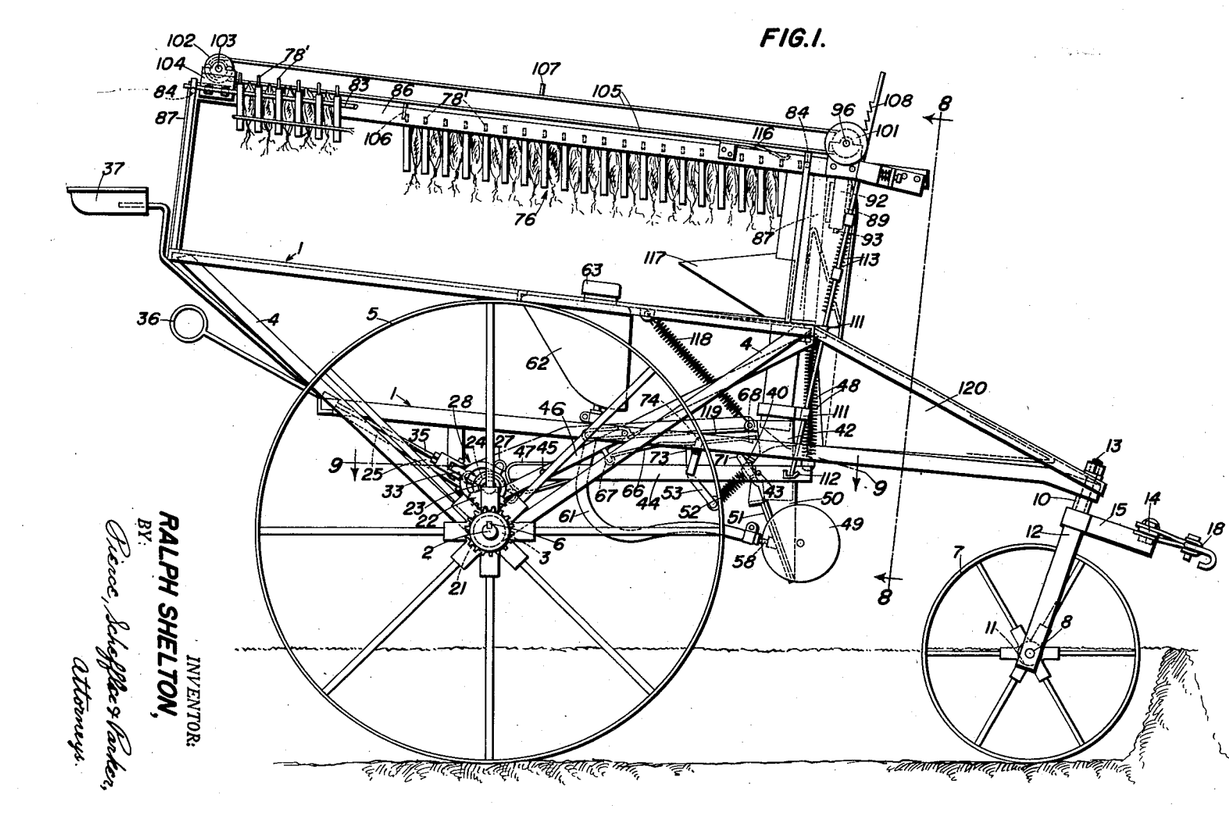
Fig. 1 is a side elevation of the transplanter, the planting and watering assembly being in the initial or plant-receiving position.

With each upward stroke, the teeth of pawl 108, pressed into engagement with the teeth on ratchet gear 98 by a spring loaded plate 114 causes gear 98 to turn by an amount sufficient to rotate the rolls 88, 89 through a half turn which pulls one of the supports 78 of the plant magazine forwardly and frees it from spring clip 115 allowing one of the magazine pockets 79 to open. As the pocket opens, as shown in Fig. 3, the plant 81 is released and falls into a funneled tube 117 whose lower end is telescoped by the upper end of tube 42 at this time as shown in Fig. 1. The plant 81 continues to fall through tube 42 and comes to rest in the closed jaws 50, 51 of the hollow dibble. Upon the next stepped advance motion of the rolls 88, 89, the next following L support 78′ at the other side of the magazine is pulled free of its retaining spring clip 116 which thus opens the next pocket 79 in the magazine to drop another plant into the planting tube 42.

A tension spring 118 the ends of which are connected to the upper end of tube 42 and to the frame 1, and a guide arm 119 linking the upper end of tube 42 with the frame strut 46 serve to guide the open mouth of tube 42 over the lower end of tube 117 as the planting assembly returns to its horizontal position.

As the magazine strip 77 is pulled forward one fold at a time, the used portion of the strip drops into a pan 120 carried on the frame 1 forward of and below rolls 88, 89, and belt 105 is rotated in a step-by-step manner to advance tab 106 or 107, whichever may be in use at the time, along the rear end of the magazine to keep the front end pressed firmly against clips 115, 116.

In view of the operational functions which have already been inserted in the description of the various components of the machine, no further complete detailed description of the manner in which the machine is operated is deemed necessary at this point to a complete understanding of the invention. Summarizing the cardinal operational features, however, a fully loaded magazine 76 on poles 83 with a rope encircling the magazine to hold the plant pockets pressed together is hung on the rails 85, 86. The forward end of the magazine is pushed into engagement with the retaining clips 115, 116, and tab 106 placed behind the rear end of the magazine. The magazine pockets will now be kept closed by the pressing action between the tab 106 and clips 115, 116, and the binding rope and poles 83 are then removed. A plain lead section 77′ of the fabric strip 77 not having the L supports 78, 78′ attached is then passed through the rollers 88, 89 and the machine is now ready for operation.

The machine can now be started along the planting row and the clutch 28 engaged by pushing inwardly on handle 36. Cam 26 is thus now driven from the axle 2 and the cam rollers 27 will successively engage the cam follower 47 on the rear end of planting arm 44 to thereby periodically rock the planting assembly downward to dig a ground hole with the dibble, release the plant into the hole and water it. Each time the planting assembly returns to its horizontal position, the feed mechanism for the plant magazine is actuated to open another pocket in the magazine and drop another plant through the tube 117 into the planting tube 42 to be deposited in the ground on the next descent of the planting assembly.

Aside from guiding the machine along the planting row, the entire planting operation is fully automatic and requires no further attention by the operator until the plant magazine is emptied. Another loaded magazine is then removed from the rack, inserted into feeding position and the planting operation continued.

In conclusion, it is to be understood that while the illustrated construction is to be preferred, various changes in the construction and arrangement of parts may be made without departing from the spirit and scope of the invention as defined in the appended claims.

I claim:

1. In a machine for setting out plants, in combination, a main support frame, running gear for the frame, a planting assembly including an arm member hinged to the frame for motion in a vertical plane about the hinge axis, a planting tube carried by said arm member forward of the hinge axis, said tube being open at its upper end and terminating in a hollow dibble at its lower end, means periodically actuating the planting assembly from a horizontal position to open a ground hole with the dibble, means actuated in timed relation with the motion of said planting assembly to open the mouth of the dibble for a brief period at the beginning of the return upward movement of said planting assemby to release a plant held therein into the hole, a magazine holding a supply of plants, a device for releasing plants individually from the magazine into the planting tube, and means controlled in timed relation with the motion of said planting assembly for periodically actuating the plant releasing device of said magazine.

2. In a machine for setting out plants, in combination, a main support frame, running gear for the frame, a planting assembly including an arm member hinged to the frame for motion in a vertical plane about the hinge axis, a planting tube carried by said arm member forward of the hinge axis, said tube being open at its upper end and terminating in a hollow dibble at its lower end, means periodically actuating the planting assembly from a horizontal position to open a ground hole with the dibble, means actuated in timed relation with the motion of said planting assembly to open the mouth of the dibble for a brief period at the beginning of the return upward movement of said planting assembly to release a plant held therein into the hole, a magazine holding a supply of plants, a device for releasing plants individually from the magazine into the planting tube, and means controlled by said planting assembly for actuating said plant releasing device.

3. In a machine for setting out plants, in combination, a main support frame, running gear for the frame, a planting assembly including an arm member hinged to the frame for motion in a vertical plane, a planting tube carried by said arm forward of the hinge axis, said tube being open at its upper end and terminating in a hollow dibble at its lower end, means periodically actuating the planting assembly downwardly from a horizontal position to open a ground hole with the dibble, means actuated in timed relation with the motion of the planting assembly to open the mouth of the dibble for a limited period at the beginning of the return upward motion of said planting assembly and release a plant held therein into the hole, a magazine holding a supply of plants, a device for releasing said plants individually from the magazine into the planting tube, and means operated in timed relation with the motion of said planting assembly for actuating the plant releasing device of the magazine to release a plant upon the return of the planting assembly to its horizontal position.

4. In a machine for setting out plants, in combination, a main support frame, running gear for the frame, a planting assembly including an arm hinged intermediate its ends to said frame and a planting tube carried at the forward end of said arm, said tube being open at the upper end and terminating in a movabe jaw hollow dibble at its lower end, means periodically tilting said arm and tube downwardly from an initial substantially horizontal position to open a ground hole with the dibble for depositing a plant held in the dibble, means operated in timed relation with the movement of the planting assembly for actuating the movable jaw of said dibble for a brief period at the beginning of the return upward motion of said assembly to thereby open the dibble mouth and release the plant held therein, a magazine holding a supply of plants, a device for releasing said plants individually from the magazine, a chute for guiding plants released from the magazine into the planting tube, and means operated in timed relation with each return of said planting assembly to its initial horizontal position for actuating the plant releasing device of the magazine.

5. A planting machine as defined in claim 4 wherein the means for periodically tilting the planting assembly comprises a power take-off including a clutch controlled cam driven from the rear axle of the running gear, said cam including a plurality of equally angular spaced cam surfaces engageable with a cam follower carried at the rear end of the arm member of said planting assembly.

6. A planting machine as defined in claim 4 and which further includes a water tank carried on the frame, a normally closed valve positioned within the movable jaw of the dibble, means including a flexible hose connecting the water tank with the valve, and means opening said valve simultaneously with actuation of the dibble jaw to thereby release water onto the dropped plant.

7. A planting machine as defined in claim 4 wherein the plant magazine is comprised of a long strip of fabric material including transverse L-shaped supporting members attached hereto at spaced intervals at alternate sides of the strip to establish folding lines by which the fabric strip is folded back and forth upon itself to form pockets between adjacent folds, and each such pocket holds a plant to be planted by the machine.

8. In a machine for setting out plants which includes a periodically operated planting assembly for depositing the plants in ground holes at spaced intervals along the planting row, a magazine for feeding plants to the planting assembly one-by-one in timed relation with the operation of the assembly, said magazine comprising a long strip of fabric material including transverse L-shaped supporting members attached thereto at spaced intervals at alternate sides of the strip to establish folding lines by which the fabric strip is folded back and forth upon itself to form pockets between adjacent folds, each such pocket holding a plant to be planted by the machine.

9. In a machine for setting out plants, in combination, a main support frame, running gear for the frame, a planting assembly including an arm pivotally mounted intermediate its ends on said frame and a planting tube carried at the forward end of said arm, said tube being open at its upper end and terminating in a hollow dibble at its lower end, said dibble including a hinged jaw for opening and closing the dibble mouth, means periodically driving said planting assembly downwardly about its pivotal support from a horizontal position to open a ground hole with the dibble, a yoke secured to the movable jaw of said dibble above the hinge axis, spring means biasing said jaw to a closed position, a pivotally mounted latching arm including a latch member movable into engagement with said yoke as said planting tube reaches the lowermost position in its downward travel, said latch member rocking said movable jaw on its hinge to open the dibble mouth for a brief period at the beginning of the return upward stroke of said planting assembly to release a plant held in the dibble, a magazine holding a supply of plants, a device for releasing said plants individually from said magazine, a chute for guiding plants released from the magazine into the open end of the planting tube, and means operated in timed relation with each return of said planting assembly to its initial horizontal position for actuating the plant releasing device of the magazine.

10. In a machine for setting out plants, in combination, a main support frame, running gear for the frame, a planting assembly including an arm pivotally mounted intermediate its ends to said frame and a planting tube carried at the forward end of said arm, said tube being open at the upper end and terminating in a movable jaw hollow dibble at its lower end, means periodically tilting said arm and tube downwardly from an initial substantially horizontal position to open a ground hole with the dibble to deposit a plant held in the dibble, means operated in timed relation with the movement of the planting assembly for actuating the movable jaw of said dibble for a brief period at the beginning of the return upward motion of said assembly to thereby open the dibble mouth and release the plant held therein, a magazine holding a supply of plants, said magazine being comprised of a long strip of fabric material including transverse L-shaped supporting members attached thereto at spaced intervals at alternate sides of the strip to establish folding lines by which the strip is folded back and forth upon itself to form plant holding pockets between adjacent folds, parallel spaced rails for supporting and guiding said L support members, a pair of feed rolls between which the fabric strip is passed, means operated in timed relation with each return of said planting assembly to its initial horizontal position for driving said rolls in a step-by-step manner to open said pockets in succession to release the plants held therein, and a chute beneath the plant release point of the magazine for guiding plants into the planting tube.

RALPH SHELTON.

REFERENCES CITED

The following references are of record in the file of this patent:

UNITED STATES PATENTS

| Number | Name | Date |
|---|---|---|
| 885,091 | Sinclair | Apr. 21, 1908 |
| 1,052,459 | Carr | Feb. 11, 1913 |
| 1,657,944 | Stocker et al. | Jan. 31, 1928 |
| 2,009,785 | Pomieraniec | July 30, 1935 |
| 2,332,262 | Rowe | Oct. 19, 1943 |
| 2,333,945 | Mast et al. | Nov. 9, 1943 |

FOREIGN PATENTS

| Number | Country | Date |
|---|---|---|
| 468,367 | Germany | Nov. 12, 1928 |
| 480,386 | Germany | Aug. 1, 1929 |
| 581,912 | Germany | Aug. 4, 1933 |
| 637,693 | France | Feb. 6, 1928 |
| 715,020 | France | Sept. 21, 1931 |